No. 826,557. PATENTED JULY 24, 1906.
G. L. FOGLER.
PROCESS OF REDUCING METALS.
APPLICATION FILED AUG. 19, 1904.
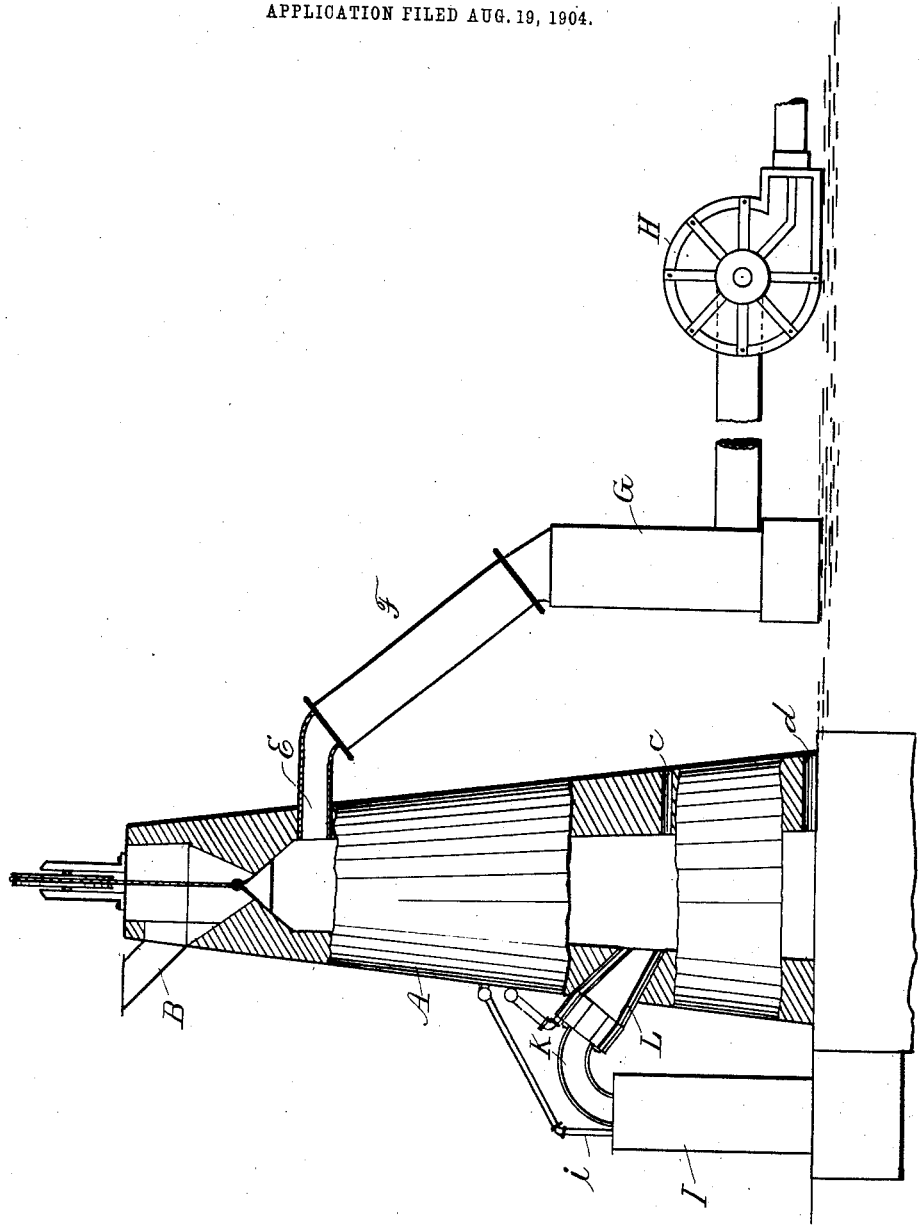
Witnesses
Inventor
George L. Fogler
By Chas. D. Swett,
Attorney

UNITED STATES PATENT OFFICE.

GEORGE LUTHER FOGLER, OF PITTSBURG, PENNSYLVANIA.

PROCESS OF REDUCING METALS.

No. 826,557.  Specification of Letters Patent.  Patented July 24, 1906.

Application filed August 19, 1904. Serial No. 221,421.

*To all whom it may concern:*

Be it known that I, GEORGE LUTHER FOGLER, a citizen of the United States, residing at Pittsburg, in the county of Allegheny and State of Pennsylvania, have invented certain new and useful Improvements in Processes for Reducing Metals; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention has for its object the reduction of iron and other metals from their ores or oxids under diminished pressure by the action of a highly-heated reducing gas or gases exteriorly produced.

As the operation of the smelting of iron is now practiced the ores are fed into blast-furnaces, together with solid fuel and flux, and the reduction is effected through the action of the burning fuel or the products thereof produced after ignition by the blast of air which is also introduced into the furnace.

Under the conditions of pressure existing in blast-furnaces the action of these products is limited, since by the combustion of the carbon and hydrocarbons $CO_2$, $CO$, and $H_2O$ are produced, and under the conditions of pressure which obtain according to Sir L. Bell at a temperature near whiteness iron will be oxidized by a mixture of $CO_2$ and $CO$ in equal proportions, while ferrous oxid cannot be reduced when the mixture of $CO_2$ and $CO$ contains as much as eleven per cent., by volume, of $CO_2$. Water-vapor also oxidizes iron at high temperatures under pressure.

It is well known that with a change in pressure the chemical reactions taking place at a certain temperature are greatly modified, and I have taken advantage of this fact to utilize gaseous fuel produced outside of the reduction-furnace and forced into the charge through the twyers under pressure, by which to set free the metal from its compounds. Each twyer is supplied with the superheated gases by a pipe projecting into its outer end and leaving between the gas-pipe and twyer an annular space in communication with the atmospheric air of such size as to admit under the siphoning action of the gas-flow and against the resistance offered by the charge a proportion of air insufficient to effect complete combustion, and so regulated as to produce the greatest increase in the temperature of the gases without impairing their action in reducing the ores. The gases which under the conditions of increased pressure and insufficient air-supply for complete combustion pass into and through the reduction zone expand and flow rapidly upward both because of the greater porosity of the upper charge and because of the partial vacuum which is maintained at the upper or exhaust end of the furnace.

By the use of the exhaust the $CO_2$ and $H_2O$ produced in the combustion are quickly removed from the reduction zone.

When the metal-containing compound is pure, its reduction may be effected when heated to the proper temperature by the action of the reducing-gas alone under the diminished pressure; but as these compounds occur in nature and in commerce they are commingled with other compounds, which must be removed before the reduction can take place, and therefore when these conditions exist fluxes of a nature and in the proportions best suited to remove these impurities must be employed.

To carry out my process, using as an illustration an ore of iron, I make use of a stack-furnace, which permits of the charges of ore and flux being fed in at the top and the metal and slag being discharged at the bottom, or any other equivalent structure.

The accompanying drawing shows a preferred form of furnace adapted to carry out the details of my process.

This furnace (designated by the letter A) is shown in side elevation and partly in section.

B denotes the bell and hopper charging device.

c is the slag-vent, and d the metal-discharging vent.

E is a gas-outlet leading through the downcomer F and the purifier G to the exhaust mechanism H.

I is the reducing-gas heater through which the exteriorly-produced gas is fed through pipe K and twyer L to the furnace. The pipe i feeds gas to heat the reducing-gas in the heater I, and air is drawn into the twyer L around the pipe K. By these means the furnace is heated to the desired temperature, and the supplies of gas and air are so regulated as to maintain this temperature while the reducing gas or gases are supplied to the furnace. The exhaust is then applied, the charge of ore and flux fed in, and the fusion and reduction proceeds until the molten metal and slag are removed. Thus the operation may be a continuous or a discontinuous one.

I am aware that it is well-known practice to reduce metals by means of gas exteriorly produced, which is passed over the mass when heated; but heretofore the containing vessel has been heated from the outside, whereas as I practice the art the vessel is heated on the inside.

What I claim, and desire to secure, is—

The herein-described continuous process of smelting ores which consists in forcing previously-heated reducing-gases into a reduction zone maintained in the ore, furnishing a supply of air insufficient to effect complete combustion around the gas-supply whereby the incompletely-burning gases reduce the ores, maintaining a partial vacuum above the charge whereby the gaseous products of the incomplete combustion and of the reduction expand into the upper portion of the charge and rapidly leave the reduction zone; continuously maintaining the reducing atmosphere in the furnace, drawing off the products of the smelting process and supplying fresh ore and flux from time to time.

In testimony whereof I affix my signature in presence of two witnesses.

GEORGE LUTHER FOGLER.

Witnesses:
P. J. McCALL,
P. Jos. HESS.